United States Patent [19]

Gibson et al.

[11] Patent Number: 4,881,085

[45] Date of Patent: Nov. 14, 1989

[54] VACUUM POWERED MANUALLY OPERATED CLEANING TOOL FOR ACTIVE SURFACES OF FLUID-JET PRINT HEAD

[75] Inventors: Jeffrey W. Gibson, Pleasant Garden, N.C.; Hal Bayman, Richardson, Tex.

[73] Assignee: Burlington Industries, Inc., Greensboro, N.C.

[21] Appl. No.: 86,486

[22] Filed: Aug. 18, 1987

[51] Int. Cl.⁴ ......................... G01D 15/18; A47L 9/00

[52] U.S. Cl. ................................. 346/75; 346/140 R; 15/415 R; 15/420

[58] Field of Search ............... 346/75, 140 R; 15/411, 15/415 R, 420, 410

[56] References Cited

U.S. PATENT DOCUMENTS

| | | | |
|---|---|---|---|
| 2,531,370 | 11/1950 | Thompson | 15/321 |
| 2,553,034 | 5/1951 | Bridge | 15/369 |
| 2,610,351 | 9/1952 | Lilly | 15/401 |
| 3,085,267 | 4/1963 | Jacuzzi | 15/1.7 |
| 3,945,021 | 3/1976 | Kraus et al. | 346/75 |
| 4,007,465 | 2/1977 | Chaudhary | 346/140 R |
| 4,123,761 | 10/1978 | Kimura et al. | 346/140 R |
| 4,144,537 | 3/1979 | Kimura et al. | 346/140 R |
| 4,158,575 | 6/1979 | Townsend | 134/6 |
| 4,177,471 | 12/1979 | Mitchell | 346/140 R |
| 4,223,322 | 9/1980 | van Raamsdonk | 346/140 R |
| 4,296,418 | 10/1981 | Yamazaki et al. | 346/75 |
| 4,306,245 | 12/1981 | Kasugayama et al. | 346/140 R |
| 4,340,897 | 7/1982 | Miller | 346/140 R |
| 4,362,572 | 12/1982 | Wallace | 134/18 |
| 4,369,456 | 1/1983 | Cruz-Uribe et al. | 346/140 R |
| 4,394,669 | 7/1983 | Ozawa et al. | 346/140 R |
| 4,450,456 | 5/1984 | Jekel et al. | 346/140 R |
| 4,479,136 | 10/1984 | Lewis et al. | 346/140 R |

*Primary Examiner*—H. Broome
*Assistant Examiner*—Gerald E. Preston
*Attorney, Agent, or Firm*—Nixon & Vanderhye

[57] ABSTRACT

A manually operated cleaning tool for use in a liquid jet printing apparatus of the type having a manifold assembly with an interior cavity and which generates a linear array of droplet streams under pressure through an orifice plate in fluid communication with the interior cavity. The preferred embodiment of the cleaning tool comprises a vacuum head for contacting the surface of the orifice plate, an adjustable handle operatively connected to the vacuum head for rotatably positioning the vacuum head to contact the orifice plate along a corridor defined by the orifice plate mounting structure, a fluid conduit operatively connected to the vacuum head, and a vacuum apparatus for continuously removing excess printing fluid from the orifice plate.

29 Claims, 3 Drawing Sheets

FIG. 5
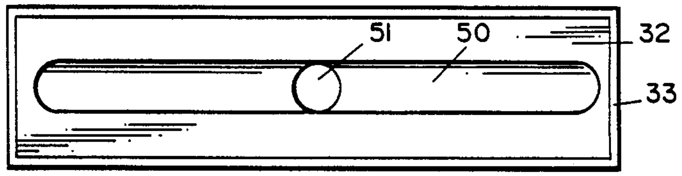
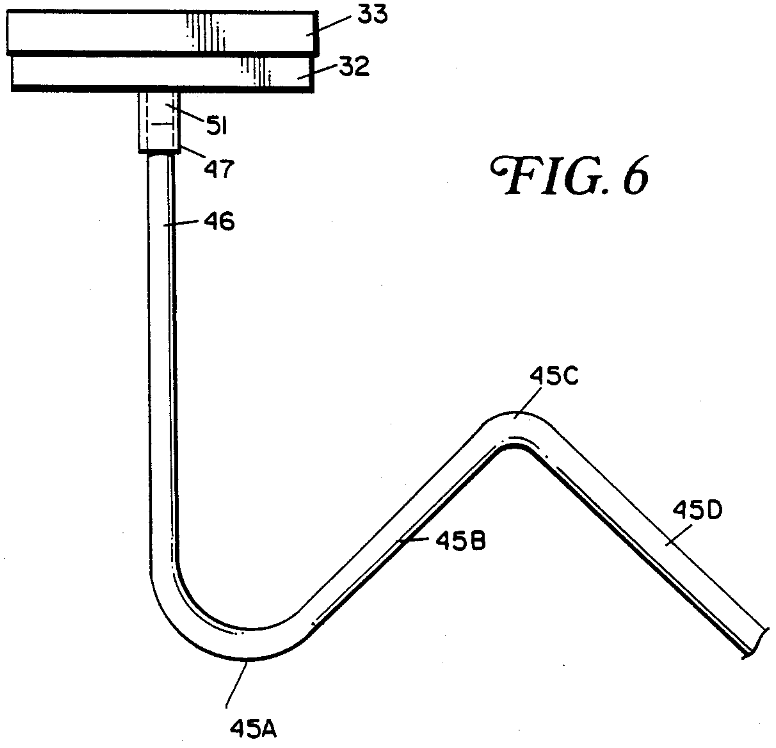
FIG. 6

VACUUM POWERED MANUALLY OPERATED CLEANING TOOL FOR ACTIVE SURFACES OF FLUID-JET PRINT HEAD

FIELD OF THE INVENTION

The present invention relates to the field of non-contact fluid marking devices commonly known as "ink jet" or "fluid-jet" devices and, more particularly, to an apparatus for removing excess printing liquid from the exposed face of an orifice plate and its associated mounting structure in a fluid-jet printing apparatus.

BACKGROUND AND SUMMARY OF THE PRESENT INVENTION

Non-contact printers which utilize charged droplets are generally known in the art as shown by U.S. Pat. Nos. 3,373,437 to Sweet et al; 3,560,988 to Krick; 3,579,721 to Kaltenbach; and 3,596,275 to Sweet. Typically, fluid filaments of ink, dye or the like pass through the orifices of an orifice plate having an array of individually controllable electrostatic charging electrodes disposed downstream of the orifice plate along the "droplet formation zone". In accordance with known principles of electrostatic induction, each fluid filament assumes an electrical charge opposite in polarity but related in magnitude to the electrical charge of its respective charging electrode. When a droplet of fluid separates from the filament, an induced electrostatic charge is trapped in the droplet. Subsequently, the charged droplet passes through an electrostatic field of vector quantity which is oriented so that the droplet is deflected from the normal path towards the droplet catching structure. Uncharged droplets proceed along a normal path and are deposited upon a receiving substrate.

Recently, it has been proposed to utilize ink jet devices as a means &:o print patterns or the like on textile materials using apparatus such as that described in commonly-owned U.S. Ser. No. 428,490 to Gamblin, the disclosure of which is hereby incorporated by reference. In order to achieve fine printing of patterns on a textile substrate, it is necessary to utilize an orifice plate having a much longer linear array of very small orifices sized in the range of, for example, 0.00035 to 0.020 inch diameters. The use of such longer orifice plates having high density, i.e., closely-spaced, orifices generally requires mounting structures such as that described in commonly-owned U.S. Ser. No. 879,049 to Sutera, filed June 26, 1986, the disclosure of which is also incorporated herein by reference. Typically, the fluid-jet printing assembly and related mounting structure include a manifold assembly which defines upper and lower fluid subchambers, the latter of which includes an outlet slot for the printing fluid to pass through a linear array of orifices in the orifice plate.

One problem which exists with respect to fluid-jet printing devices, particularly those using longer orifice plates and closely-spaced orifices, is that during periods of shutdown, excess printing fluid may accumulate in and around the "active surfaces" of the print head such as the exterior surface of the orifice plate and/or its associated mounting structure. On occasion, the excess printing fluid may "mist out" on portions of the charging electrode and/or the deflection electrode structure and, if not removed, may ultimately cause the electrodes to short or otherwise adversely affect the performance of the ink jet printer. In addition, during shutdown periods, ink droplets which remain on the exterior surface of the orifice plate and associated mounting structure may dry and form solid particles and/or ink residue in and around the orifices, again adversely affecting the printing operation. Such undesirable ink residues and particulates may ultimately clog the orifices or become deposited on the printed substrate. Thus, their presence in the system should be avoided if possible.

Although it is known that an orifice plate may be cleaned periodically or between successive printing operations in order to avoid the above problems, the use of longer orifice plate constructions has resulted in an additional unexpected problem. The active surfaces of the ink jet printer which require cleaning, particularly the exterior surfaces of the orifice plate and associated mounting structure, are often inaccessible and cannot be effectively cleaned without the entire structure being disassembled in a costly and time consuming procedure. Heretofore, the surface of an orifice plate such as that described in commonly-owned Ser. No. 428,490 could be cleaned and/or purged only after the orifice plate had been removed or the print head at least partially disassembled to permit access to the plate and fluid manifold assembly. For example, excess fluid has been removed by swabbing or contacting the plate with fabric, sponges or other absorbent materials, both with and without cleaning solvents. However, before employing such manual techniques, the entire print head structure must generally be dismantled.

It is also known to use a suction device for purposes of removing excess ink in an around an orifice plate. Again, however, such devices have been useful only after the orifice plate or its associated mounting structure has been physically removed from the printer, thereby resulting in a cumbersome and time consuming separate cleaning operation. Conventional suction devices are also unacceptable for assembled structures, particularly printers having longer orifice plates, since they are incapable of reaching the various inaccessible active surfaces in and around the orifice plate.

The present invention substantially eliminates the above problems by providing a cleaning tool which eliminates the need to dismantle the print head, thus avoiding the time consuming procedures associated with conventional orifice cleaning techniques. In particular, the unique configuration and adjusting means used with the suction device in accordance with the present invention provides a more efficient tool for manually removing excess printing fluid from the exposed face of the fluid-jet orifice plate, without any need to physically remove the orifice plate from the print head. In addition, the entire cleaning operation can be conducted in a shorter period of time and in a more thorough manner than conventional techniques.

It has now been found that excess printing liquid can be removed from the vicinity of the orifice plate using adjustable suction means which are selectively applied to the active surfaces of the print head. In the preferred embodiment of the invention, the operative end of the cleaning device includes an elongated cylindrically-shaped head comprised of an elastomeric material having a generally beveled configuration at one end, i.e. tapered toward the open end thereof, and sized to fit in the area defined by the orifice plate and its associated mounting structure. The elongated head also contains a suction cavity which terminates in a centrally located exit port which, in turn, connects to a suction source via a uniquely configured fluid conduit.

The beveled (tapered) end of the vacuum head includes side wall portions which define an orifice plate contact surface inclined at an acute angle to the longitudinal axis of the elongated elastomeric vacuum head. The side portions terminate in a front surface generally perpendicular to the longitudinal axis of the vacuum head to define a nose portion. The preferred embodiment of the invention also utilizes a pair of angular notches in the form of V-shaped cut-out portions on each of the side walls which provide bending flexibility to the elongated head when pressure is exerted on the nose portion as the cleaning head makes contact with the orifice plate during a cleaning operation.

An alternative embodiment of the present invention utilizes an elongated head having a generally frusto-conical configuration, again sized to fit in the area defined by the orifice plate and its associated mounting structure. The frusto-conical head also contains a suction cavity. However, unlike the first embodiment, the head is surrounded by a peripheral skirt comprised of an elastomeric material which forms a pair of opposing vacuum lips having a laterally extending opening therethrough. The bottom of the suction cavity terminates in a centrally located exit port which, in turn, connects to a suction source via the fluid conduit.

A third embodiment of the present invention utilizes a rotatably mounted vacuum head having a generally rectangular, block-like configuration. With this particular embodiment, the vacuum head does not make direct contact with the orifice plate but instead traverses along the surface of the orifice plate clamp members and orifice plate corridor during a normal cleaning operation.

One important aspect of the present invention relates to the means for rotatably and angularly adjusting the position of the vacuum head. The adjusting means includes a rigid handle or "wand" formed from the fluid conduit having a configuration which is specially designed to avoid the structural orifice plate mounting components associated with the fluid-jet device. The unique configuration of the handle also permits the operator to "feel", without necessarily viewing, the relative position of the elongated vacuum head as it traverses the exposed surfaces of the orifice plate and its associated mounting structure. Because access to the exposed surfaces of the orifice plate is restricted, an operator may thereby use the invention to clean the entire orifice plate without actually viewing individual sections of the plate and/or its mounting structure. The rigid handle is configured to have a curved portion which avoids any obstruction with the surrounding mounting structure and a straight handle portion which may be manually grasped by the operator to manipulate the head along the exposed surface of the orifice plate. Preferably, the straight handle portion is disposed along an axis which angularly intersects the center point of the cleaning head exit port.

Thus, one object of the cleaning apparatus according to the present invention is to provide a more efficient method for manually removing excess or unwanted fluid from the active surfaces of a fluid-jet print head, including the exposed face of the fluid-jet orifice plate and its associated mounting components.

It is a further object of the present invention to provide a means for removing excess liquid from portions of the orifice plate and associated structure which are otherwise inaccessible.

It is still a further object of the present invention to provide a method and apparatus for cleaning the orifice plate without the time consuming conventional procedure of dismantling the existing print head structure.

Further aspects and advantages of the present invention will become more clear to the reader after careful consideration is given to the detailed description of the preferred exemplary embodiments which follow.

INFORMATION DISCLOSURE STATEMENT

The reader's attention is directed to the following publications so that further insight into the novel features of the present invention can be obtained.

U.S. Pat. No. 3,085,267 to Jacuzzi
U.S. Pat. No. 2,610,351 to Lilly
U.S. Pat. No. 2,553,034 to Bridge
U.S. Pat. No. 2,531,370 to Thompson
U.S. Pat. No. 3,945,021 to Krause et al
U.S. Pat. No. 4,007,465 to Chaudhary
U.S. Pat. No. 4,123,761 to Kimura et al
U.S. Pat. No. 4,144,537 to Kimura et al
U.S. Pat. No. 4,158,575 to Townsend
U.S. Pat. No. 4,177,471 to Mitchell
U.S. Pat. No. 4,223,322 to van Raamsdonk
U.S. Pat. No. 4,296,418 to Yamazaki et al
U.S. Pat. No. 4,306,245 to Kasugaayama et al
U.S. Pat. No. 4,362,572 to Wallace
U.S. Pat. No. 4,369,456 to Cruz-Uribe et al
U.S. Pat. No. 4,450,456 to Jekel et al
U.S. Pat. No. 4,479,136 to Lewis et al The '267 patent to Jacuzzi discloses a cleaning head comprising a U-shaped central body section defining a cavity therein. A conduit extends through the cavity and connects to a flexible hose which in turn connects to the vacuum intake port of conventional filtering equipment.

The '351 patent to Lilly discloses a "squeegee" nozzle attachment for vacuum cleaners which comprises a V-shaped plate having arms extending forwardly from the apex of the plate at an angle of approximately 45° to the center line or axis.

The '370 patent to Thompson describes a liquid discharging and collecting apparatus which includes a mophead, suction tubes which convey liquid to and from the mophead, means for simultaneously directing a soap solution or clear water through the inlet tube and means to convey a waste liquid through the suction tube to a suitable waste receptacle.

The patent to Krause et al '021 discloses a liquid jet recorder having a suction pump which activates prior to commencement of the recording operation. Residues of recording liquid adhering to the control electrode are thereby aspirated and/or recirculated prior to commencement of a recording operation.

The '465 patent to Chaudhary shows a system for self-cleaning ink jet heads and includes a manifold supply of pressurized fluid in which one of the supply paths at the top of the manifold is reversible. If air or an impurity causing a nozzle clog is encountered in the head, the top supply flow path may be reversed thereby establishing a cross flow at or near the orifice which tends to loosen and remove the clog.

The method of purging ink passages in Kimura et al '761 includes the steps of applying pressure for purging the ink within the ink supply source and causing a flow of ink in the passages in one direction towards the orifice, thereby removing bubbles and impurities in the ink passages. Suction means may also be provided to facilitate the purging operation.

The '537 patent to Kimura et al discloses a method and apparatus for capping the nozzle of a print head to prevent dust from adhering to the nozzle and to eliminate bubbles from entering the nozzle. Purging means comprising a suction tube may also be used to clean the nozzle.

The patent to Townsend '575 describes an apparatus for removing soil and bacteria from a hard floor surface by providing resiliently flexible parallel strips and thereafter applying suction to the space between the strips so that the lower edge portions engage the floor surface.

The '471 patent to Mitchell describes a carriage and raceway mechanism in which the carriage is mounted on the print head for driving the ink jet head back and forth along the raceway to allow the head to eject droplets on the recording medium.

The '322 patent to Van Raamsdonk provides a method and apparatus for cleaning the nozzle surface of an ink writing head by bringing a liquid absorbing cleaning medium into contact with portions of the nozzle surface which surround the nozzle openings, maintaining contact for a period of time to permit ink to flow from the nozzles in the direction toward the cleaning medium and wetting the nozzle surface portions such that particles to be removed may be dissolved and carried away by the cleaning medium.

Yamazaki et al '418 provides reverse solvent flushing means in which an ink clog is automatically sensed in the ejection nozzle and is cleared by moving a cap into covering engagement with the nozzle orifice, causing solvent to flow through the nozzle from the cap to dissolve the clogged ink and thereafter causing air to flow through the cap and nozzle to purge the solvent.

The '245 patent to Kasugaayama et al discloses a liquid jet recording device having a cleaning protective means for the orifice which is disposed in a reset position at one end of a cleaning shaft of the liquid-jet recording device.

Wallace '572 provides a method and apparatus for removing dust and trapped air from the orifices of an ink jet printer in which a vacuum is applied periodically to clean the ink jet head of dust, entrapped air and excess ink.

The '456 patent to Cruz-Uribe et al discloses an apparatus for cleaning or protecting nozzles in which a movable absorbant cleaning belt is brought into contact with the nozzles. The belt extends from a supply reel and includes a plurality of embossed elements and openings positioned in sequence. A sensor for sensing the position of the opening in the belt over the nozzles controls the belt movement and thereby permit the embossed elements to be drawn across the nozzles to clean ink and impurities.

Jekel et al '456 discloses a cleaning device for capping and cleaning an ink jet printer comprising a drivable capping cushion having an endless surface and drivable cleaning tape. The capping and cleaning devices are accessible in a capping position through a window in a cassette wall which comprises two rollers that cooperate at their circumference and include cleaning tape passing between the rollers.

The '136 patent to Lewis et al provides an apparatus for cleaning contaminants from the face and orifices of a print head which includes a cleaning card having a foam strip secured across the front face of the card near its bottom edge, the upper portion of the card forming step-like protrusions from each lateral or side edge of the narrower portion of the card. The foam strip is saturated with a cleaning solvent and the lower portion of the card is adopted for insertion between a card guide and the face of the print head.

BRIEF DESCRIPTION OF THE ACCOMPANYING DRAWINGS

Reference will be hereinafter made to the accompanying drawings wherein like reference numerals throughout the various Figures denote like structural elements and wherein:

FIG. 5 is a bottom plan view of the vacuum head portion of the manually operated cleaning tool depicted in FIG. 4;

FIG. 6 is an elevation view of the cleaning apparatus depicted in FIG. 4;

DETAILED DESCRIPTION OF THE PREFERRED EXEMPLARY EMBODIMENT OF THE PRESENT INVENTION

Figure 1:
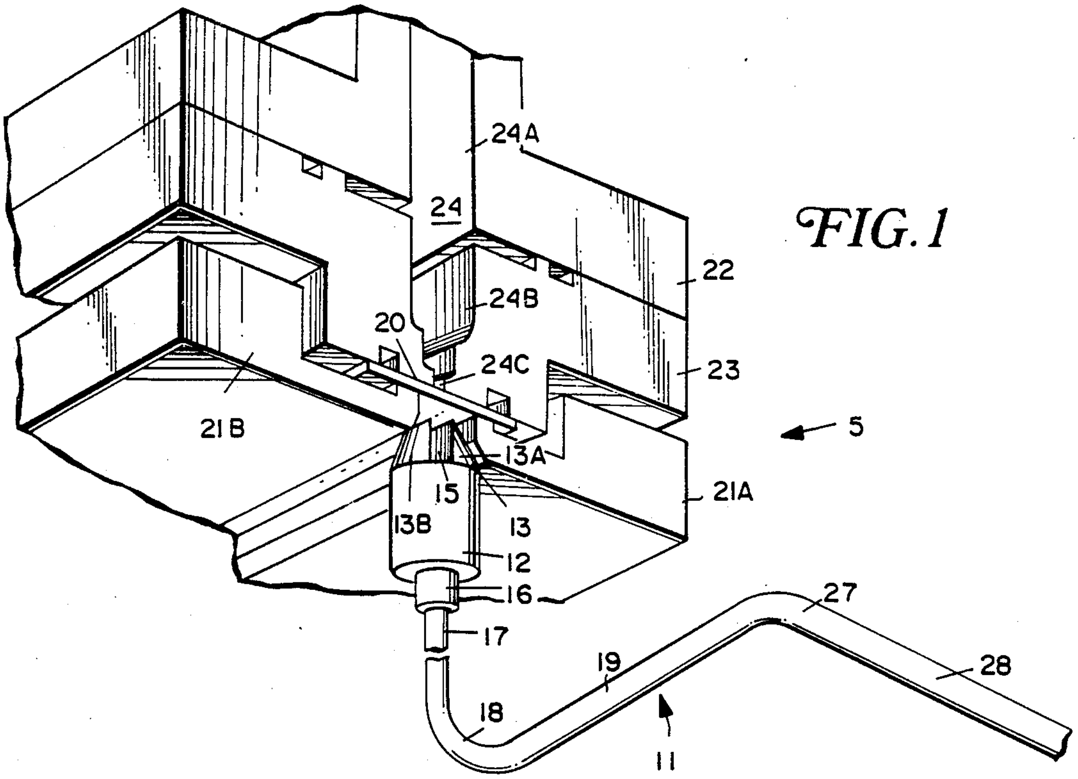
FIG. 1 is a perspective view of a fluid-jet apparatus having an exemplary embodiment of the manually operated orifice plate cleaning tool in accordance with the present invention shown in its operative position.

A fluid-jet apparatus in which the present invention finds particular utility is shown in accompanying FIG. 1 and is depicted generally at 5. The fluid-jet print head structure includes a fluid manifold assembly which defines a fluid supply chamber (shown generally as 24) having upper and lower subchambers 24A and 24B, respectively. The lower end of the supply chamber establishes an outlet slot 24C in fluid communication with a linear array of orifices in orifice plate 20.

As FIG. 1 indicates, orifice plate 20 is mounted in the fluid manifold assembly by way of a pair of laterally-opposing clamp (holdown) members 21A and 21B. Each clamp member includes a clamp body having a substantially horizontal clamp arm which defines a bearing surface to bear against orifice plate 20 when it is clamped to the manifold assembly.

FIG. 1 also illustrates that the manifold assembly is preferably formed by cooperating upper and lower fluid manifold members 22 and 23, respectively. Once in position, the orifice plate clamping assembly defines a corridor of space between opposing faces of clamp members 21A and 21B which extends the entire length of the linear array of orifices on both sides of the longitudinal axis of orifice plate 20. Those in the art will also appreciate that once the orifice plate is mounted and the associated charging and deflection electrodes moved into position for purposes of performing a print operation, the active exterior surfaces in and around the orifice plate become virtually inaccessible to conventional manual cleaning means.

Figure 2:
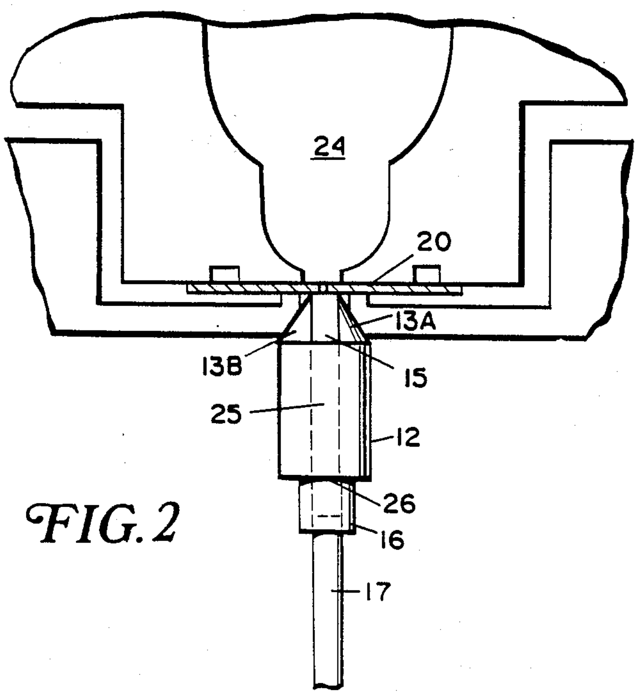
FIG. 2 is a cross-sectional elevation view of an exemplary manually operated cleaning tool in accordance with the invention.
Figure 3:
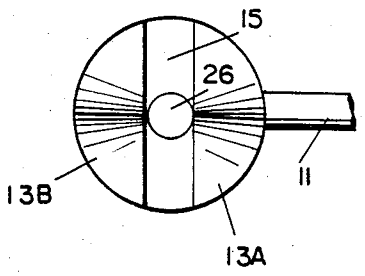
FIG. 3 is a top plan view of the elongated vacuum head portion of the cleaning tool depicted in FIGS. 1 and 2.

FIG. 1 also shows the preferred exemplary embodiment of the cleaning tool used to remove excess liquid from the exposed face of orifice plate 20 after the printing apparatus has been shut down. A vacuum powered, manually operated cleaning tool 10 includes an elongated vacuum head 12 having a generally frusto-conical configuration at its operative end. The vacuum head is sized to fit within the corridor defined by the orifice plate clamp members and includes frusto-conical skirt 13 comprised of an elastomeric material which defines a laterally extending opening 15 and a vacuum cavity (shown as 25 on FIG. 2). The elastomeric skirt also forms a pair of vacuum "lips" 13A and 13B at the operative end of the elongated head which contact the active surfaces of orifice plate 20 during a typical cleaning operation. The inside surfaces of lips 13A and 13B are disposed in parallel confronting relationship to one another and thereby bifurcate the frusto-conical skirt to form laterally extending opening 15. During the cleaning operation, the entire vacuum head can be rotated slightly about its axis, thereby positioning lips 13A and 13B oblique to the longitudinal axis of the orifice plate. As such, the amount of vacuum may be increased since the normal air flow through the laterally extending opening 15 is reduced accordingly. Vacuum head 12 also contains a centrally located exit port (item 26 on FIGS. 2 and 3) which connects to a suction source via specially configured manual adjusting means shown at 11 and described in greater detail below.

The elastomeric materials suitable for use in the cleaning tool according to the present invention may be of any conventional variety and include, for example, plastics or rubber compositions having sufficient flexibility at room temperature to deform slightly under moderate contact pressure with the orifice plate during the cleaning operation. Such materials are well known in the art and are suitable for use as the contact surface of the elongated head because of their resilience and absorbency. They also tend to form a more effective vacuum seal upon contact with the exterior surface of the orifice plate and allow the operator to apply a minimum amount of contact pressure to components being cleaned, thereby reducing the possibility of damage during the cleaning operation.

Elongated vacuum head 12 operatively connects to fluid conduit 17 by way of an elastomeric bushing shown at 16 which is sized to permit the rotational orientation of vacuum head 12. Fluid conduit 17 forms rigid handle 11 as described below, which in turn connects by way of flexible tubing to a vacuum source which is engaged during the cleaning operation to transport the excess ink and residue materials to a suitable waste receptacle (not shown).

As indicated above, one important aspect of the manually operated cleaning tool in accordance with the present invention concerns the means for angularly and rotatably adjusting the elongated vacuum head during a cleaning operation. In particular, the unique configuration of the operator handle avoids the structural orifice plate mounting components described above and, at the same time, permits the operator to "feel" the relative position of the vacuum head vis-a-vis the exposed surfaces of orifice plate 20.

Figure 4:
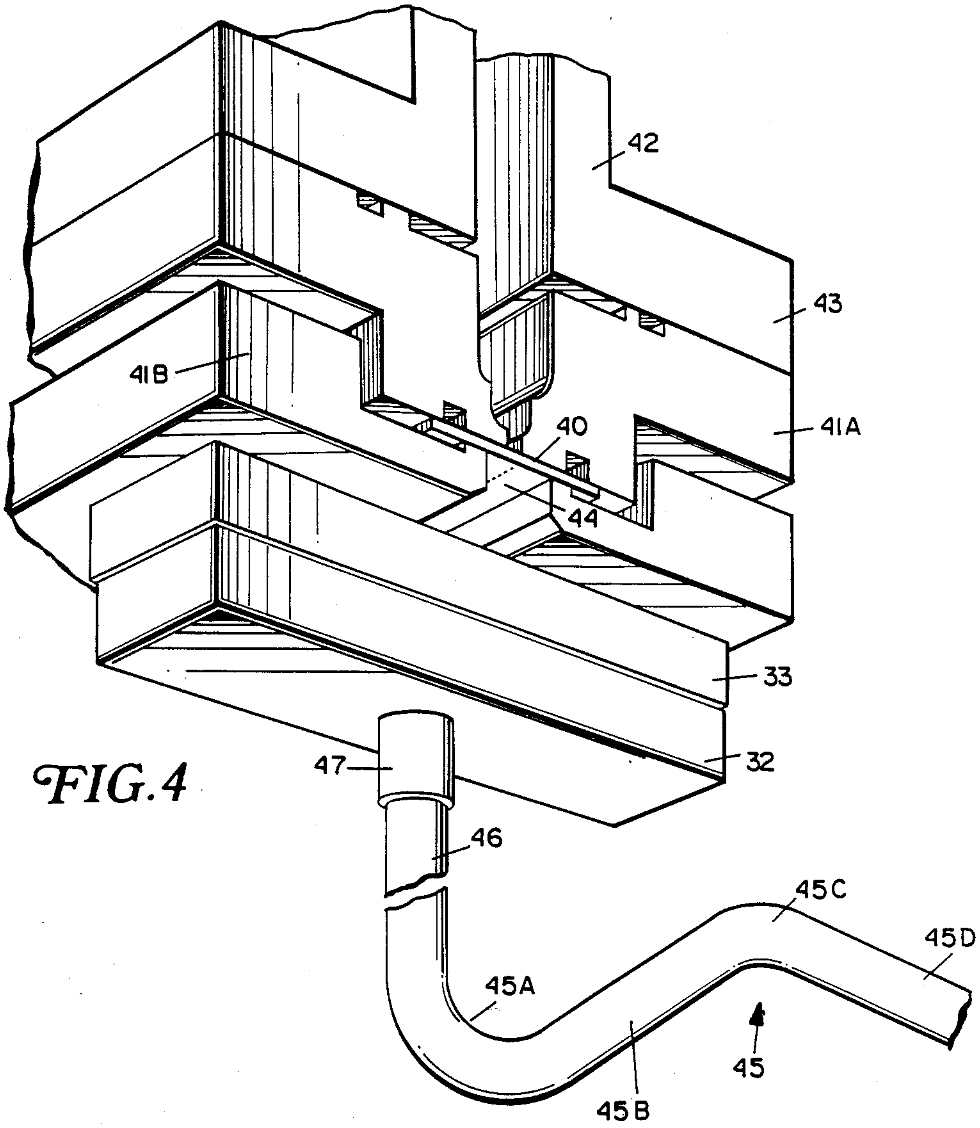
FIG. 4 is a perspective view of fluid-jet printing apparatus having an alternative embodiment of a vacuum powered manually operated cleaning tool in accordance with the invention shown in its operative position.

As FIGS. 1,4 and 6 illustrate, rigid handle 11 of the invention has a unique "S-like" configuration comprising a substantially vertical section which terminates in a curved "drip loop" segment 18 on FIG. 1, which joins a second straight segment 19, which in turn terminates in curved portion 27 followed by straight gripping segment 28. Handle portion 19 is thus disposed along an axis which angularly intersects the center point of the exit port 26 in the vacuum head by virtue of the curved configuration which defines "drip loop" 18. The "drip loop" facilitates removal of excess printing liquid and permits the operator to position the contact surface of the vacuum head against the orifice plate using the same pressure and with the same orientation as the vacuum head traverses the entire length of orifice plate 20.

Adjusting handle 11 is also configured such that the straight gripping portion 28 may be manually grasped by the operator to thereby manipulate vacuum head 12 along the exposed surface of the orifice plate while avoiding the obstructions to cleaning otherwise presented by the associated mounting structure. In operation, the vacuum head can thus be maneuvered along the entire length of the orifice plate without the operator visually perceiving its exact position within the orifice corridor at any given time. That is, the operator can effectively "feel" the position of the vacuum head relative to the exposed orifice plate surface even though the handle is structurally configured to avoid the associated mounting structures of the orifice plate assembly.

An alternative embodiment of the present invention is depicted in FIGS. 4,5 and 6 of the drawings and utilizes a rotatably mounted vacuum head having a generally rectangular, block-like (as opposed to frusto-conical) configuration. Unlike the first embodiment, the vacuum head of this second embodiment does not make direct contact with the of the orifice plate but instead traverses along the surface of the orifice plate clamp members 41A and 41B along the orifice plate corridor 44 during a cleaning operation.

As FIGS. 4 and 5 illustrate, the vacuum head includes a solid vacuum block 32 which has a fluid receiving chamber 50 formed therein for receiving the excess printing fluid. Chamber 50 has a substantially rectangular configuration but with rounded edges which form an elliptical opening at the top. The vacuum head also contains an elastomeric member 33 which is bonded to the inside surface of fluid chamber 50 and drapes over the top surface of vacuum block 32 to form a pair of elastomeric "squeegee" lips which contact the surface of clamp members 41A and 41B as the head moves along the longitudinal axis of the orifice plate. Preferably, the operative contact surface of the vacuum head is substantially transverse to the longitudinal axis of orifice plate 40. However, the vacuum head may be rotatably adjusted to any desired cleaning angle. FIG. 4 also shows the fluid-jet manifold assembly which includes upper and lower fluid manifold members 42 and 43, respectively.

As in the first embodiment, vacuum block 32 contains an outlet vacuum tube opening operatively connected to fluid conduit 46 which forms rigid handle 45 which may be adjusted and manipulated by the operator to angularly and rotatably position the cleaning tool relative to orifice plate 40. Vacuum head 40 is rotatably mounted to fluid conduit 46 by means of elastomeric bushing 47 to allow for rotation and positioning of the elastomeric lips in any desired orientation against the surface of clamp members 41A and 41B. As in the first embodiment, drip loop 45A is also configured such that the curved portion near the head avoids obstruction with the surrounding mounting structure of the fluid-jet device and opens into a first straight handle portion 45B terminating in a second curved segment 45C, which in turn ends in straight gripping section 45D which may be manually grasped by the operator to manipulate the head, preferably with the elastomeric vacuum lips substantially transverse to the longitudinal axis of the orifice plate.

FIG. 5 of the drawings provides a more detailed view of exit opening 51 which is centrally disposed in fluid cavity 50 formed in vacuum block 32.

Figure 7:
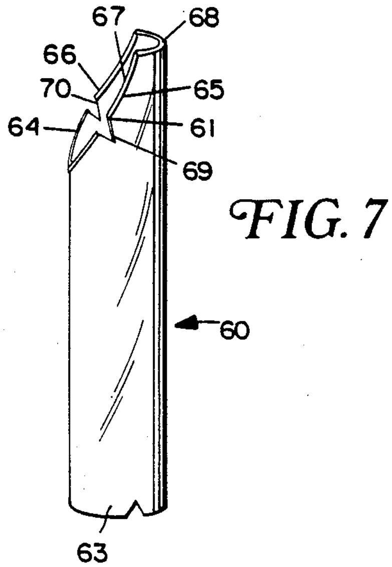
FIG. 7 is a perspective view of an alternative embodiment of the elongated head portion of the manually operated cleaning tool in accordance with the invention.
Figure 8:
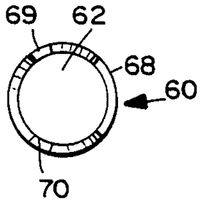
FIG. 8 is a top plan view of the elongated head depicted in FIG. 7.

The third (and preferred) embodiment of the elongated vacuum head portion of the present invention is depicted in FIGS. 7 and 8 of the drawings and includes an elongated cylindrically-shaped head 60 comprised of an elastomeric material having a generally beveled configuration (shown generally as 61). That is, the head is tapered toward the open end thereof and sized to fit in the area defined by the orifice plate and its associated mounting structure. Elongated head 60 also contains a suction cavity 62 Which terminates in a centrally located exit port 63 Which, in turn, connects to a suction source via a uniquely configured fluid conduit as described above with respect to embodiments 1 and 2.

The beveled (tapered) end of elongated vacuum head 60 includes side wall portions 64 and 65, the top surfaces of which (shown as 66 and 67) define a contact surface inclined at an acute angle to the longitudinal axis of the elongated head. The side portions terminate in a front surface 68 generally perpendicular to the longitudinal axis of the head to define a nose portion. The preferred embodiment of the invention also utilizes a pair of angular notches consisting of V-shaped cut-out portions 69 and 70 on each of the side walls which provide bending flexibility to the elongated head when pressure is exerted on the nose portion as the cleaning head makes contact with a surface during a cleaning operation and which provide a vacuum break to prevent the tool from adhering to the surface being cleaned. The notches are positioned such that, if desired, the entire contact surface defined by side walls 66 and 67 will contact the surface being cleaned. In this embodiment, the tool conveniently may be used to clean the electrodes of the fluid jet device (not shown), with the fluid conduit preferably being non-conductive. The head 60 may be removed from the fluid conduit, rotated and remounted on the conduit to reverse the positions of exit port 63 and the end having surfaces 66 and 67. As such, the tool is useful for cleaning the orifice plate itself.

While the present invention has been described herein in what is presently considered to be the most preferred embodiments thereof, those in the art will appreciate that many modifications may be made thereof, which modifications shall be accorded the broadest scope of the appended claims so as to encompass all equivalent methods, assemblies and/or structures.

What is claimed is:

1. A manually operated cleaning tool for use in a liquid jet printing apparatus of the type having a manifold assembly including an interior fluid cavity, means for generating a linear array of droplet streams under pressure through an orifice plate in fluid communication with said interior cavity, and mounting means for mounting said orifice plate to said manifold assembly, said cleaning tool comprising:

vacuum head means for contacting the active surfaces of said orifice plate and said mounting means, said vacuum head means comprising an elongated head having a fluid passageway formed therein for receiving an transporting excess printing fluid, connector means for operably connecting said vacuum head means to said adjusting means and said fluid conduit, and a pair of vacuum lips for contacting said active surfaces of said orifice plate and said mounting means, wherein said vacuum lips have a generally frusto-conical configuration and are disposed in parallel confronting relationship to define a laterally extending opening therethrough;

adjusting means for rotatably and angularly positioning said vacuum head means to contact said active surfaces;

a fluid conduit operatively connected to said vacuum head means; and vacuum means for continuously removing excess printing fluid from said active surfaces of said orifice plate and said mounting means through said fluid conduit.

2. A cleaning tool according to claim 1, wherein said elongated head consists of an elastomeric material.

3. A cleaning tool according to claim 1, wherein said adjusting means includes a handle formed from said fluid conduit which operatively connects to said vacuum head means and is disposed along an axis which angularly intersects the longitudinal axis of said vacuum head means.

4. A cleaning tool according to claim 1, wherein said elongated head is connected to said adjusting means by way of an elastomeric bushing.

5. A cleaning tool according to claim 3, wherein said adjusting means further comprises a straight handle portion for gripping said cleaning tool and a curved loop portion between said vacuum head means and said straight handle portion.

6. A manually operated cleaning tool for use in a liquid jet printing apparatus of the type having a manifold assembly including an interior fluid cavity, means for generating a linear array of droplet streams under pressure through an orifice plate in fluid communication with said interior cavity, and mounting means for mounting said orifice plate to said manifold assembly, said cleaning tool comprising:

vacuum head means for contacting the active surfaces of said orifice plate and said mounting means, said vacuum had means comprising a vacuum block having a laterally extending fluid channel formed therein for receiving and transporting excess printing liquid, an elastomeric member disposed in said fluid channel and over the surface of said vacuum block to define an elastomeric contact surface;

adjusting means for rotatably and angularly positioning said vacuum head means to contact said active surfaces, said adjusting means including a handle formed from said fluid conduit which operatively connects to said vacuum head means and is disposed along an axis which angularly intersects the longitudinal axis of said vacuum head means;

a fluid conduit operatively connected to said vacuum head means; and vacuum means for continuously removing excess printing fluid from said active surfaces of said orifice plate and said mounting means through said fluid conduit.

7. A cleaning tool according to claim 6, wherein said vacuum head means is rotatably mounted on said adjusting means.

8. A cleaning tool according to claim 6, wherein said vacuum block is operatively connected to said adjusting means by way of an elastomeric bushing.

9. A cleaning tool according to claim 8, wherein said adjusting means further comprises a straight handle portion for gripping said cleaning tool and a curved loop portion between said vacuum head means and said straight handle portion.

10. A cleaning tool according to claim 6, wherein said vacuum head means is operatively connected to said adjusting means and to said fluid conduit for contacting said orifice plate mounting means along a path substantially transverse to the longitudinal axis of said orifice plate.

11. A manually operated cleaning tool for use in a liquid jet printing apparatus of the type having a manifold assembly including an interior fluid cavity, means for generating a linear array of droplet streams under pressure through an orifice plate in fluid communication with said interior cavity, and mounting means for mounting said orifice plate to said manifold assembly, said cleaning tool comprising:

- vacuum head means for contacting the active surfaces of said orifice plate and said mounting means, said vacuum head means comprising an elongated head portion having a fluid passageway formed therein for receiving and transporting excess printing fluid, said fluid passageway terminating in a contact surface at the open end of said elongated head and having a generally tapered configuration formed at an acute angle to the longitudinal axis of a said elongated head, wherein said tapered end of said elongated head includes side wall portions which terminate in a contact surface generally perpendicular to the longitudinal axis of said elongated head and defined a nose portion thereof;
- adjusting means for rotatably and angularly positioning said vacuum head means to contact said active surfaces;
- a fluid conduit operatively connected to said vacuum head means; and
- vacuum means for continuously removing excess printing fluid from said active surfaces of said orifice plate and said mounting means through said fluid conduit.

12. A cleaning tool according to claim 11, wherein each of said wall side portions includes a V-shaped notch for providing bending flexibility to said elongated head.

13. A cleaning tool according to claim 11, wherein said elongated head portion consists of an elastomeric material.

14. A manually operated cleaning tool for use in a liquid jet printing apparatus of the type having a manifold assembly including an interior fluid cavity, means for generating a linear array of droplet streams under pressure through an orifice plate in fluid communication with said interior cavity, and mounting means for mounting said orifice plate to said manifold assembly, said cleaning tool comprising:

- vacuum head means for contacting the active surfaces of said orifice plate and said mounting means, said vacuum head means comprising an elongated head having a fluid passageway formed therein for receiving and transporting excess printing fluid, connector means for operably connecting said vacuum head means to said adjusting means and said fluid conduit, and a pair of elastomeric vacuum lips for contacting said active surfaces of said orifice plate and said mounting means;
- adjusting means for rotatably and angularly positioning said vacuum head means to contact said active surfaces;
- a fluid conduit operatively connected to said vacuum head means; and
- vacuum means for continuously removing excess printing fluid from said active surfaces of said orifice plate and said mounting means through said fluid conduit.

15. A cleaning tool according to claim 14, wherein said elongated head consists of an elastomeric material.

16. A cleaning tool according to claim 14, wherein said vacuum lips have a generally frusto-conical configuration and are disposed in parallel confronting relationship to define a laterally extending opening therethrough.

17. A cleaning tool according to claim 14, wherein said adjusting means includes a handle formed from said fluid conduit which operatively connects to said vacuum head means and is disposed along an axis which angularly intersects the longitudinal axis of said vacuum head means.

18. A cleaning tool according to claim 14, wherein said elongated head is connected to said adjusting means by way of an elastomeric bushing.

19. A cleaning tool according to claim 18, wherein said adjusting means further comprises a straight handle portion for gripping said cleaning tool and a curved loop portion between said vacuum head means and said straight handle portion.

20. A manually operated cleaning tool for use in a liquid jet printing apparatus of the type having a manifold assembly including an interior fluid cavity, means for generating a linear array of droplet streams under pressure through an orifice plate in fluid communication with said interior cavity, and mounting means for mounting said orifice plate to said manifold assembly, said cleaning tool comprising:

- vacuum head means for contacting the active surfaces of said orifice plate and said mounting means, said vacuum head means comprising a vacuum block having a laterally extending fluid channel formed therein for receiving and transporting excess printing liquid, an elastomeric member disposed in said fluid channel and over the surface of said vacuum block to define an elastomeric contact surface;
- adjusting means for rotatably and angularly positioning said vacuum head means to contact said active surfaces;
- a fluid conduit operatively connected to said vacuum head means; and
- vacuum means for continuously removing excess printing fluid from said active surfaces of said orifice plate and said mounting means through said fluid conduit.

21. A cleaning tool according to claim 20, wherein said vacuum head means is rotatably mounted on said adjusting means.

22. A cleaning tool according to claim 20, wherein said adjusting means includes a handle formed from said fluid conduit which operatively connects to said vacuum head means and is disposed along an axis which angularly intersects the longitudinal axis of said vacuum head means.

23. A cleaning tool according to claim 20, wherein said vacuum block is operatively connected to said adjusting means by way of an elastomeric bushing.

24. A cleaning tool according to claim 20, wherein said adjusting means further comprises a straight handle portion for gripping said cleaning tool and a curved loop portion between said vacuum head means and said straight handle portion.

25. A cleaning tool according to claim 20, wherein said vacuum head means is operatively connected to said adjusting means and to said fluid conduit for contacting said orifice plate mounting means along a path substantially transverse to the longitudinal axis of said orifice plate.

26. A manually operated cleaning tool for use in a liquid jet printing apparatus of the type having a manifold assembly including an interior fluid cavity, means for generating a linear array of droplet streams under pressure through an orifice plate in fluid communication with said interior cavity, and mounting means for mounting said orifice plate to said manifold assembly, said cleaning tool comprising:

vacuum head means for contacting the active surfaces of said orifice plate and said mounting means, said vacuum head means comprising an elongated head portion having a fluid passageway formed therein for receiving and transporting excess printing fluid, said fluid passageway terminating in a contact surface at the open end of said elongated head and having a generally tapered configuration formed at an acute angle to the longitudinal axis of said elongated head;

adjusting means for rotatably and angularly positioning said vacuum head means to contact said active surfaces;

a fluid conduit operatively connected to said vacuum head means; and vacuum means for continuously removing excess printing fluid from said active surfaces of said orifice plate and said mounting means through said fluid conduit.

27. A cleaning tool according to claim 26, wherein said tapered end of said elongated head includes side wall portions which terminate in a contact surface generally perpendicular to the longitudinal axis of said elongated head and defining a nose portion thereof.

28. A cleaning tool according to claim 27, wherein each of said wall side portions includes a V-shaped notch for providing bending flexibility to said elongated head.

29. A cleaning tool according to claim 26, wherein said elongated head portion consists of an elastomeric material.

* * * * *